United States Patent
Bae

(10) Patent No.: US 8,705,609 B2
(45) Date of Patent: Apr. 22, 2014

(54) MOVING IMAGE CODING DEVICE AND METHOD

(75) Inventor: Tae Meon Bae, Daegu (KR)

(73) Assignee: SK Planet Co., Ltd. (KR)

( * ) Notice: Subject to any disclaimer, the term of this patent is extended or adjusted under 35 U.S.C. 154(b) by 369 days.

(21) Appl. No.: 12/737,764

(22) PCT Filed: May 11, 2009

(86) PCT No.: PCT/KR2009/002462
§ 371 (c)(1),
(2), (4) Date: Feb. 10, 2011

(87) PCT Pub. No.: WO2010/018916
PCT Pub. Date: Feb. 18, 2010

(65) Prior Publication Data
US 2011/0135002 A1    Jun. 9, 2011

(30) Foreign Application Priority Data

Aug. 11, 2008  (KR) .................. 10-2008-0078410

(51) Int. Cl.
    *H04B 1/66* (2006.01)
(52) U.S. Cl.
    USPC ............................. 375/240; 375/17
(58) Field of Classification Search
    USPC ................... 375/16, 240.16, 240.17
    See application file for complete search history.

(56) References Cited

U.S. PATENT DOCUMENTS

| 5,488,419 A * | 1/1996 | Hui et al. ................. 375/240.17 |
| 5,929,940 A | 7/1999 | Jeannin |
| 2005/0123039 A1 | 6/2005 | Song et al. |
| 2005/0207496 A1 * | 9/2005 | Komiya et al. ........... 375/240.16 |
| 2006/0013317 A1 | 1/2006 | Lainema |
| 2007/0165716 A1 * | 7/2007 | Kitamura et al. ......... 375/240.12 |
| 2008/0117971 A1 * | 5/2008 | Ramachandran et al. .................. 375/240.16 |

FOREIGN PATENT DOCUMENTS

CN            1627825 A        6/2005

OTHER PUBLICATIONS

Cheng Lu, "Motion Estimation of Multi-Frame Block Matching in the Super-resolution Restoration", Natural Sciences Journal of Harbin Normal University, vol. 22, No. 6, 2006, pp. 9-12.

* cited by examiner

*Primary Examiner* — William C Vaughn, Jr.
*Assistant Examiner* — Naod Belai
(74) *Attorney, Agent, or Firm* — Baker Hostetler LLP

(57) ABSTRACT

The present invention relates to a moving image coding apparatus and method involving the simultaneous parallel running of respective modules, namely: a segment-unit-coding module in which an input image frame is divided into segment units and the integer pel (integer pixel) motion is estimated while at the same time the 1/n pixel images are generated with respect to the segments of the image coded in the coding module; and a macroblock-unit-coding module in which the segments of the image frame whose the integer pel motion has been estimated in the segment-unit-coding module are received as input in the form of macroblock units and are coded in macroblock units through the 1/n pixel motion estimation. By separating the coding units into different modules and employing the techniques of parallel processing and pipelining, the present invention makes it possible to effect high-speed encoding with reduced delay in the coding rate due to differences in the processing speeds of the respective modules.

12 Claims, 5 Drawing Sheets

MOVING IMAGE CODING DEVICE AND METHOD

TECHNICAL FIELD

The present invention relates to a moving image coding apparatus and method and, more particularly, to a moving image coding apparatus and method, in which an image frame is simultaneously inputted to a segment-unit-coding module in units of segments and to a macroblock-unit-coding module in units of macroblocks, and the segment-unit-coding module estimates an integer pel (integer pixel) motion for the segments of the image frame and simultaneously generates a 1/n pixel image for the segments of a coded image frame and, at the same time, the macroblock-unit-coding module codes each of the macroblocks within the segment having the estimated integer pel (integer pixel) motion by estimating a 1/n pixel motion.

BACKGROUND ART

In general, digital image data is compressed by an efficient compression method instead of being used as it is because the amount of data is greatly increased owing to its inherent characteristic and in a process of digitalizing an analog signal.

Digital image data is compressed using, chiefly, three kinds of methods. A method of reducing temporal redundancy, a method of reducing spatial redundancy, and a method of reducing generated codes based on a statistical characteristic of the generated codes are chiefly used. A representative method of reducing temporal redundancy is a motion estimation and compensation method, which is being used in most of moving image compression standards, such as MPEG or H.263.

FIG. 1 is a block diagram showing a conventional H.264 moving image coding apparatus.

Referring to FIG. 1, the H.264 moving image coding apparatus includes a motion estimation unit ME 100, a motion compensation unit MC 110, an intra-mode estimation unit 120, a transform/quantization unit 130, an inverse transform/inverse quantization unit 140, an entropy coding unit 150, a deblocking filter 160, and a reference image storage unit 170.

The motion estimation unit 100 performs a function of finding a motion vector from several sheets of reference images and a macroblock mode determination function of finding an optimal macroblock type with the least bit rate and error.

Furthermore, the motion estimation unit 100 estimates an integer pel motion in units of macroblocks and then perform half pel and quarter pel motion estimation.

The motion compensation unit 110 performs a function of acquiring a compensation image from the reference images based on the motion vector and the macroblock mode type found by the motion estimation unit 100. Here, the motion compensation unit 110 is limited to a structure for acquiring a difference between two images, and a process of acquiring subsequent compensation images is continued by the transform/quantization unit 130.

The intra-mode estimation unit 120 performs a function of selecting an optimal intra-estimation mode by performing estimation from adjacent and surrounding blocks when coding a macroblock in an intra mode and performs a function of acquiring a compensation image, subjected to intra-mode estimation, from previously-coded and adjacent blocks using the selected intra-estimation mode.

The transform/quantization unit 130 performs a discrete cosine transform and performs a function of quantizing the transformed coefficients. The inverse transform/inverse quantization unit 140 performs an opposite function to the transform/quantization unit 130.

The entropy coding unit 150 performs entropy coding using bit allocation according to a probability that quantized DCT coefficients will occur.

The deblocking filter 160 performs a function of improving a restoration image, acquired through the inverse transform/inverse quantization unit 140, to an image of a better picture quality. The improved image is stored in the reference image storage unit 170, and it becomes a reference image for subsequently inputted images.

FIG. 2 is a flowchart illustrating a method of the conventional H.264 moving image coding apparatus coding a moving image.

Referring to FIG. 2, the H.264 moving image coding apparatus performs coding on the first macroblock to $n^{th}$ macroblock of an input image frame in units of macroblocks by estimating integer pel, half pel, and quarter pel motions at step S200. After the coding of the image frame is completed at step S202, the H.264 moving image coding apparatus decodes the coded image frame at step S204.

The method of the H.264 moving image coding apparatus coding the macroblocks is described below. After estimating the integer pel motion, the H.264 moving image coding apparatus estimates the half/quarter pel motions with respect to the integer pel motion-estimation image. Next, the H.264 moving image coding apparatus determines a mode and, and transforms, quantizes, and codes the half/quarter pel motion-estimated images using the determined mode.

Next, the H.264 moving image coding apparatus generates a half/quarter pel image by interpolating the decoded image at step S206. The generated half/quarter pel image is used to estimate the motion of a next image.

As described above, all the functions other than the function of generating the half/quarter pel image through interpolation are sequentially performed in order to code one macroblock. The coding of a next macroblock is started after the coding of a previous macroblock is finished. After all the macroblocks are coded, an image decoded from the coded image is obtained. The half/quarter pel image is generated by interpolating the decoded image and is prepared to be used to estimate the motion of a next image.

The above-described H.264 moving image coding apparatus consumes a lot of time in order to perform coding because of a heavy computational load. In particular, some processes, such as motion estimation, the generation of a quarter pel image, and deblocking, require a heavy computational load, thus causing to delay the coding time.

In particular, a block-based coding apparatus, such as H.264, divides an image frame into macroblocks and performs coding in units of macroblocks. The block-based coding apparatus is configured to code a next macroblock after coding a previous macroblock.

In the case where a specific process constituting a step of coding the macroblocks consumes a greater execution time than other processes, a phenomenon in which the entire coding time is delayed by the specific process is generated.

This phenomenon is greatly influenced in terms of performance in the case of a coder having, in particular, a pipeline structure. In order to solve the problem, there is a problem in that the time that it takes to execute processes, requiring a lot of time, is reduced similarly to other processes or the coder structure has to be changed.

DISCLOSURE

Technical Problem

An object of the present invention is to provide a moving image coding apparatus and method, which is capable of performing parallel coding on an image frame in units of segments and in units of macroblocks at the same time, thereby enabling high-speed coding.

Another object of the present invention is to provide a moving image coding apparatus and method, which can reduce the delay of the coding speed due to a difference in the processing speed between modules and enables high-speed encoding by applying different coding units to modules and using parallel processing and pipelining schemes.

For example, a system simultaneously utilizing a Graphic Processing Unit (GPU) and a CPU may have improved performance because the GPU and the CPU are executed in parallel. However, the units of a task, processed by the CPU and the GPU, and the processing speeds of the CPU and the GPU are quite different because the GPU includes several tens to several hundreds of processing units and the CPU has one processing unit with very high performance. An object of the present invention is to make parallel two devices having different units of a task and different processing speeds, such as a GPU and a CPU, by taking the above problem in view of moving image coding so that one device (for example, GPU) of the two devices processes the input of a segment unit (i.e., a great unit) and the other device (for example, CPU) of the two devices processes the input of a macroblock unit. Furthermore, an object of the present invention is to enable high-speed coding by dividing an image coding process into a process of performing processing in units of segments at once and a process of performing processing in units of macroblocks in order to be applied to the parallelized structure and by suggesting a coder structure suitable for the processes.

Technical Solution

To achieve the above objects, according to an aspect of the present invention, there is provided a moving image coding apparatus, comprising a segment-unit-coding module for receiving a segment-unit image, estimating an integer pel motion and, at the same time, generating an image, coded by a macroblock-unit-coding module, as a 1/n pixel image; and a macroblock-unit-coding module for receiving then image, having the estimated integer pel motion, from the segment-unit-coding module in units of macroblocks and coding each of the macroblocks through 1/n pixel motion estimation for each macroblock.

Furthermore, the segment-unit-coding module estimates an integer pixel motion for a next segment in advance, before the macroblock-unit-coding module codes the image of the macroblock units having the estimated integer pixel motion.

Furthermore, while the macroblock-unit-coding module codes the image of the macroblock units having the estimated integer pixel motion, the segment-unit-coding module estimates an integer pixel motion for a next segment image and generates a 1/n pixel image for a previous segment image independently and at the same time.

Furthermore, the segment-unit-coding module comprise an integer pel motion estimation unit for estimating a motion vector of an integer pixel unit for a current image frame of segment units; a motion estimation information storage unit for storing information estimated by the integer pel motion estimation unit; and a 1/n pixel image generation unit for generating an image, coded by the macroblock-unit-coding module, as the 1/n pixel image.

Furthermore, the 1/n pixel image generation unit generates the 1/n pixel image by enlarging a reference image frame n times in order to estimate a motion for the image, coded by the macroblock-unit-coding module, at an interval of a 1/n pixel.

Furthermore, the macroblock-unit-coding module comprises a 1/n pixel motion estimation unit for estimating a 1/n pixel motion for the current macroblock image using the integer pel motion estimation information, stored in the motion estimation information storage unit, and the 1/n pixel image generated by the 1/n pixel image generation unit; a transform/quantization unit for transforming and quantizing the macroblock image estimated by the 1/n pixel motion estimation unit; an entropy coding unit for coding the image transformed and quantized by the transform/quantization unit; and an inverse transform/inverse quantization unit for inverse-transforming and inverse-quantizing the image transformed and quantized by the transform/quantization unit.

Furthermore, the macroblock-unit-coding module further comprises an intra-mode estimation unit for selecting an optimal intra-estimation mode by performing estimation from adjacent and surrounding blocks when coding the macroblock image in an intra mode and for acquiring a compensation image, subjected to intra-mode estimation, from previously coded and adjacent macroblocks using the selected intra-estimation mode.

Furthermore, the operations of the segment-unit-coding module and the macroblock-unit-coding module are performed in parallel.

Meanwhile, according to another aspect of the present invention, there is provided a method of a moving image coding apparatus coding an image frame, comprising the steps of (a) estimating an integer pel motion for segments of the image frame using a segment-unit-coding module; (b) coding the segments of the image frame, having the estimated integer pixel motion, in units of macroblocks through 1/n pixel motion estimation for each of the macroblocks within the segment using a macroblock-unit-coding module; and (c) generating a 1/n pixel image for the segments of the image frame, coded in units of the macroblocks by the segment-unit-coding module.

The steps (a) to (c) are performed on the segments of an image frame, sequentially inputted, in series.

Furthermore, the steps (a), (b), and (c) are performed on the different segments of the image frame in parallel.

Furthermore, in the case where an integer pixel motion for a $n^{th}$ inputted segment is estimated in the step (a) and a 1/n pixel image for segments, inputted by a predetermined number of times earlier than the $n^{th}$ inputted segment, is generated in the step (c), the steps (a) and (c) are performed by the segment-unit-coding module at the same time.

Furthermore, the method further comprises the step of dividing the image frame into an N number of segments before the step (a).

Furthermore, the step (b) comprises steps of estimating a motion vector of a 1/n pixel unit using the 1/n pixel image generated through the 1/n pixel motion estimation for each of the macroblocks within the segment having the integer pixel motion estimated by the segment-unit-coding module; quantizing each of the macroblocks having a motion estimated in unit of the 1/n pixel, having the motion estimated; and performing variable length coding on the quantized macroblocks.

Furthermore, generating a 1/n pixel image for a previous segment of the image frame in the step (c) comprises generating an image obtained by enlarging a reference image frame of the segments within the image frame, generated by the macroblock-unit-coding module, n times.

Meanwhile, according to yet another aspect of the present invention, there is provided a method of a moving image coding apparatus coding an image frame, comprising the steps of (a) estimating an integer pel motion for the first segment of a first input image frame; (b) coding each of macroblocks within the first segment, having the estimated integer pixel motion, through 1/n pixel motion estimation and simultaneously estimating an integer pixel motion for the second segment of the image frame; and (c) coding each of macroblocks within the second segment, having the estimated integer pixel motion, through 1/n pixel motion estimation, estimates an integer pixel motion for the third segment of the image frame, and generates a 1/n pixel image for the coded first segment simultaneously.

Here, generating the 1/n pixel image for the coded first segment in the step (a) refers to generating an image obtained by enlarging a reference image frame of the first segment, coded in units of the macroblocks, n times.

According to further yet another aspect of the present invention, there is provided a recording medium on which a program for coding an image frame is recorded, wherein the program executes the steps of (a) a segment-unit-coding module estimating an integer pel motion for the third segment of a current image frame inputted in units of segments and, at the same time, generating a 1/n pixel image for the first segment of the current image frame and (b) a macroblock-unit-coding module coding each of macroblocks within the second segment of the current frame, having an integer pixel motion estimated by the segment-unit-coding module, through 1/n pixel motion estimation.

According to further yet another aspect of the present invention, there is provided a recording medium on which a program for coding an image frame is recorded, wherein the program executes the steps of (a) estimating an integer pel motion and a 1/n pixel motion for the third segment of a current image frame inputted in units of segments and, at the same time, generating a 1/n pixel image for the coded first segment of the current image frame and (b) coding the second segment of the current image frame, having an integer pixel motion and a 1/n motion estimated, in units of macroblocks.

Advantageous Effects

According to the present invention, there can be provided a moving image coding apparatus and method, which enables high-speed coding using parallel coding in encoding an image frame.

Furthermore, encoding can be performed at high speed by applying different coding units to modules and reducing the delay of the coding speed due to a difference in the processing speed between the modules.

Furthermore, an image is processed in parallel in units of segments and in units of macroblocks at the same time, and thus the time taken for coding is reduced. Accordingly, moving image coding apparatus and method capable of improving the coding speed can be provided.

MODE FOR INVENTION

Hereinafter, detailed contents about the above-described objects, technical configurations, and operational effects thereof of the present invention will be more clearly understood from the following detailed description of the present invention, which will be described with reference to the attached drawings.

Figure 1:
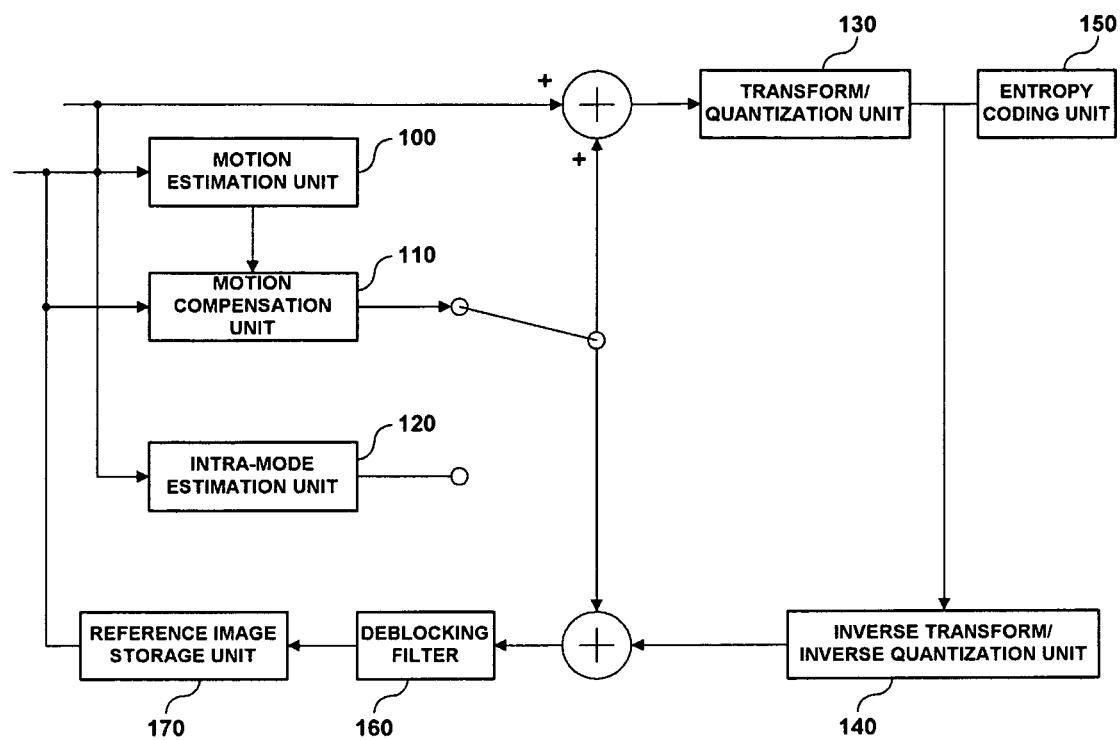
FIG. 1 is a block diagram showing a conventional H.264 moving image coding apparatus.
Figure 2:
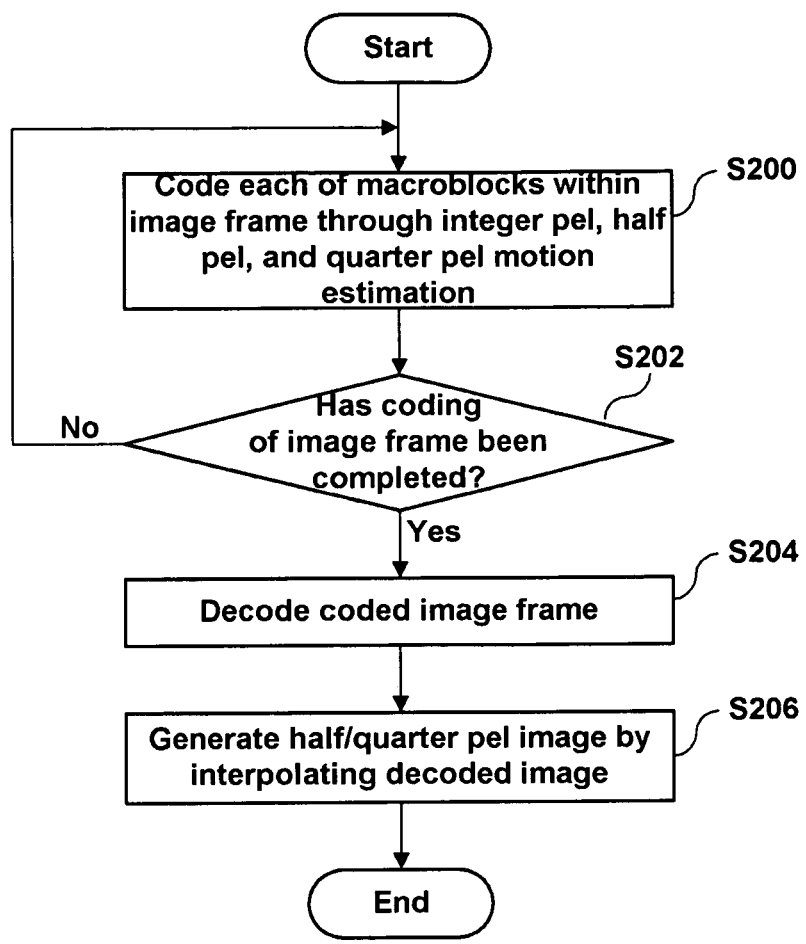
FIG. 2 is a flowchart illustrating a method of the conventional H.264 moving image coding apparatus coding a moving image.
Figure 3:
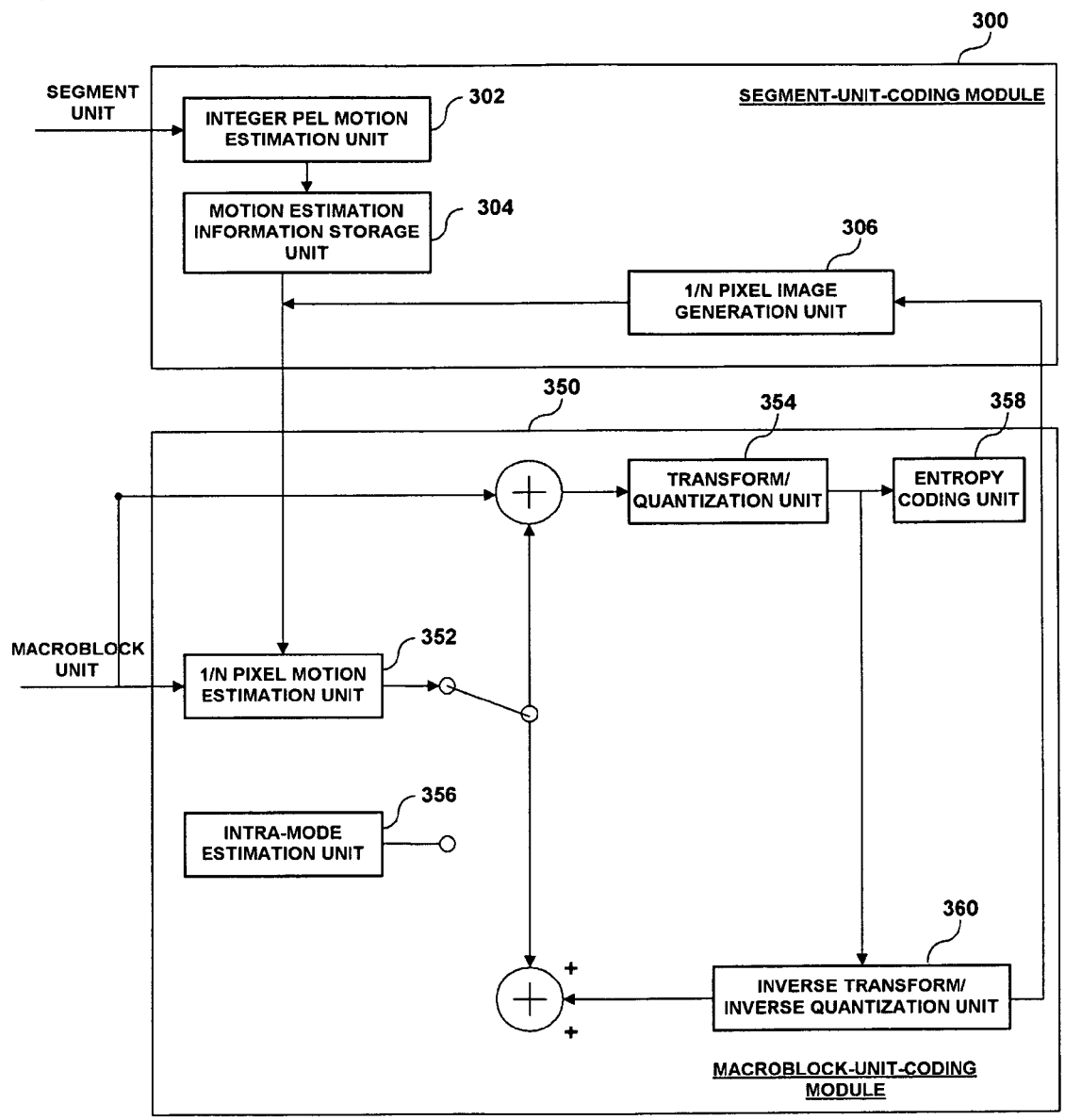
FIG. 3 is a block diagram schematically showing the construction of a moving image coding apparatus according to the present invention.

FIG. 3 is a block diagram schematically showing the construction of a moving image coding apparatus according to the present invention.

Referring to FIG. 3, the moving image coding apparatus includes a segment-unit-coding module 300 for dividing an input image frame in units of segments and estimating an integer pixel (integer pel) motion and a macroblock-unit-coding module 350 for coding each of macroblocks within the segment having its integer pel motion estimated by the segment-unit-coding module 300.

The segment-unit-coding module 300 functions to receive the image frame in units of segments and to estimate the integer pel motion and, at the same time, to generate a 1/n pixel image for the macroblocks coded by the macroblock-unit-coding module 350. Here, the segment refers to an image frame vertically divided into a predetermined number. The 1/n pixel image refers to an image obtained by enlarging a reference image frame, generated by the macroblock-unit-coding module 350, two or four times in order to estimate motion information at an interval of ½ or ¼ pixels. Here, n is an integer, and n may become a multiple of 2, such as 2 or 4 in the case of H.264.

The segment-unit-coding module 300 includes an integer pel motion estimation unit 302, a motion estimation information storage unit 304, and a 1/n pixel image generation unit 306.

The integer pel motion estimation unit 302 divides a current input image frame into a predetermined number of segments and estimates motion vectors of the current image frame, having the units of segments, in unit of an integer pel (integer pixel).

Here, the segments should be understood as a concept to temporally divide the segments in order to process an image rather than a concept to divide temporally consecutive image data. That is, even in the case of image data constituting one scene, in the case where the image data is divided into specific parts and the parts are processed with precedence relationships temporally, each of the parts may be understood as a segment.

That is, the integer pel motion estimation unit 302 calculates an integer pel cost value for a segment, having a predetermined size, of a reference frame previous to or after a segment divided with a specific size and performs integer pixel search. Here, the cost value may include the Sum of Absolute Difference (SAD) value of an absolute difference.

Here, the motion information is vector information in the x, y form and is information indicating how much has a block within an image frame been moved in 2-D from a previous reference image frame. Accordingly, the integer pel motion estimation unit estimates motion information as pixel interval resolution.

The motion estimation information storage unit 304 stores the motion estimation information estimated by the integer pel motion estimation unit 302.

The 1/n pixel image generation unit 306 generates the 1/n pixel image for the macroblocks coded by the macroblock-unit-coding module 350. Here, the macroblocks coded by the macroblock-unit-coding module 350 may be macroblocks within a segment previous to a segment on which an integer pel motion is being estimated by the integer pel motion estimation unit 302. Furthermore, the n is an integer, and the n may be a multiple of 2, such as 2 or 4, in the case of H.264.

The 1/n pixel image generation unit 306 is hereinafter referred to as a half/quarter pel image generation unit, for convenience of description.

The half/quarter pel image generation unit 306 functions to generate an image obtained by enlarging the reference image frame, generated by the macroblock-unit-coding module 350, two or four times in order to estimate motion information at an interval of a ½ or ¼ pixel.

The half/quarter pel image generation unit 306 performs a function of improving a restoration image, acquired through the inverse transform/inverse quantization unit 360 of the macroblock-unit-coding module 350, to an image having a better picture quality. The improved image becomes a reference image for images subsequently inputted.

The macroblock-unit-coding module 350 performs coding in units of macroblocks through 1/n pixel motion estimation for each of the macroblocks within the segment having its integer pel motion estimated by the segment-unit-coding module 300. Here, the 1/n pixel motion estimation includes half pel (½ pixel) motion estimation, quarter pel (¼ pixel) motion estimation, and so on.

The macroblock-unit-coding module 350 includes a 1/n pixel motion estimation unit 352, a transform/quantization unit 354, an intra-mode estimation unit 356, the inverse transform/inverse quantization unit 360, and an entropy coding unit 358.

The 1/n pixel motion estimation unit 352 estimates the 1/n pixel motion of a current macroblock using the integer pel motion estimation information, stored in the motion estimation information storage unit 304 of the segment-unit-coding module 300, and the 1/n pixel image generated by the 1/n pixel image generation unit 306.

The 1/n pixel motion estimation unit 352 is hereinafter referred to as a half/quarter pel motion estimation unit, for convenience of description.

The half/quarter pel motion estimation unit 352 estimates motion information at an interval of ½ and ¼ pixels of the current macroblock using the integer pel motion estimation information and the half/quarter pel image.

The transform/quantization unit 354 transforms and quantizes the macroblocks estimated by the 1/n pixel motion estimation unit 352. That is, the transform/quantization unit 354 functions to perform discrete cosine transform and quantize transformed coefficients.

The inverse transform/inverse quantization unit 360 performs an opposite function to the transform/quantization unit 354.

The entropy coding unit 358 performs entropy coding bit allocation according to a probability that DCT coefficients quantized by the transform/quantization unit 354 will occur.

The intra-mode estimation unit 356 selects an optimal intra-estimation mode by performing estimation from adjacent and surrounding blocks when coding macroblocks in an intra mode and acquires a compensation image, subjected to intra-mode estimation, from previously coded and adjacent macroblocks using the selected intra-estimation mode.

The operations of the segment-unit-coding module 300 and the macroblock-unit-coding module 350 configured as described above are performed in parallel. The segment-unit-coding module 300 and the macroblock-unit-coding module 350 preferably operate to process different segments at the same time.

Hereinafter, the operation of the coding apparatus is described with reference to FIGS. 4 and 5.

For convenience of description, an example in which the macroblock-unit-coding module performs half/quarter pel motion estimation and the segment-unit-coding module generates a half/quarter pel image for segments coded by the macroblock-unit-coding module is described below as an example.

Figure 4:
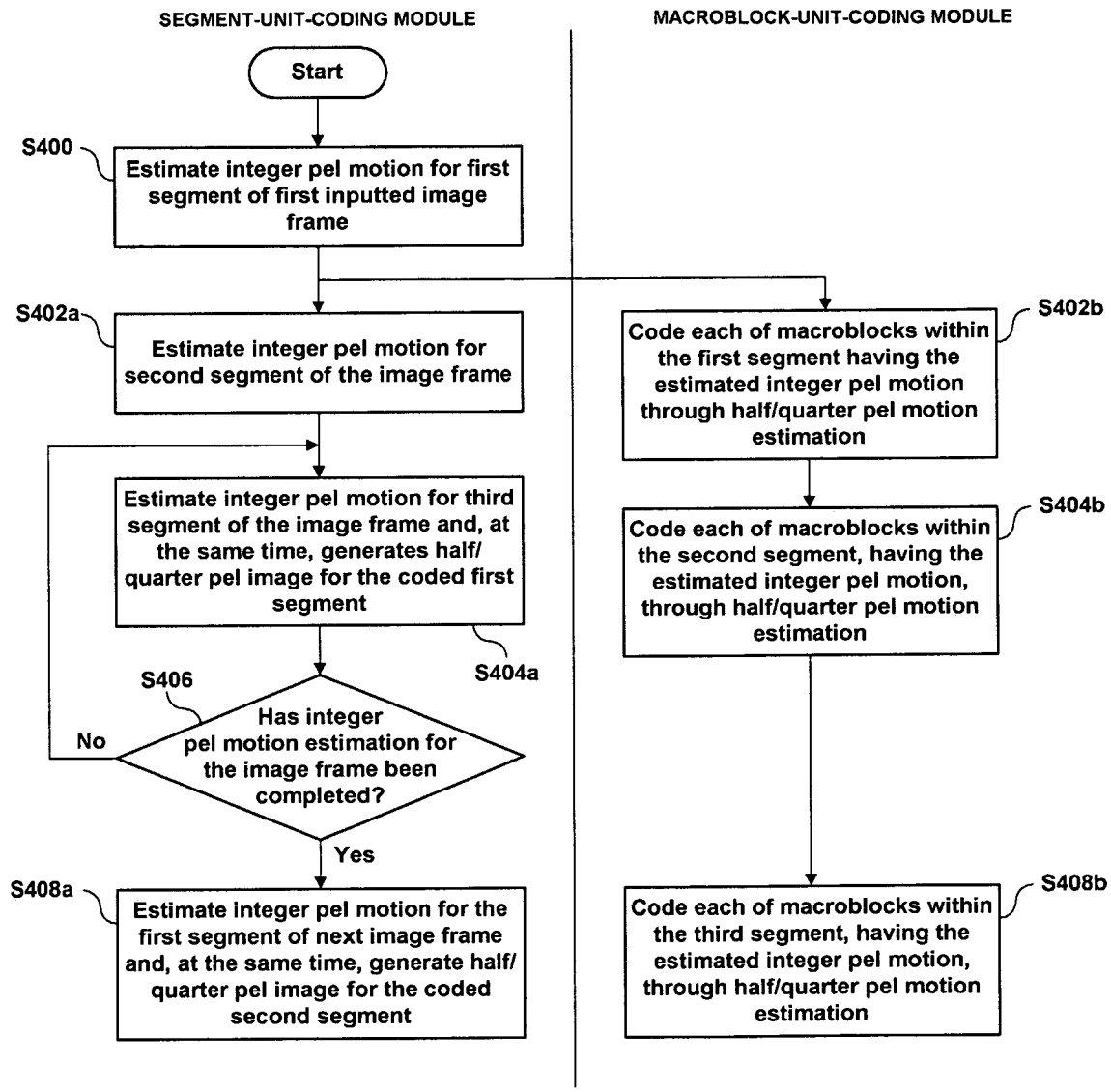
FIG. 4 is a flowchart illustrating a method of coding an image frame according to the present invention.

FIG. 4 is a flowchart illustrating a method of coding an image frame according to the present invention. Hereinafter, a case where an image frame is divided into three segments is described as an example.

Referring to FIG. 4, the segment-unit-coding module estimates an integer pel motion for the first segment of an image frame inputted in units of segments at step S400.

The macroblock-unit-coding module codes each of macroblocks within the first segment having the estimated integer pel motion through half/quarter pel motion estimation at step S402b.

While step S402b is performed, the segment-unit-coding module estimates an integer pel motion for the second segment of the image frame at step S402a. Steps S402a and step S402b are performed in parallel at the same time.

Next, the macroblock-unit-coding module codes each of macroblocks within the second segment, having the estimated integer pel motion, through half/quarter pel motion estimation at step S404b.

While step S404b is performed, the segment-unit-coding module estimates an integer pel motion for the third segment of the image frame and, at the same time, generates a half/quarter pel image for the first segment, coded at step S402b, at step S404a.

Steps S404a and S404b are performed in parallel, preferably at the same time.

After an integer pel motion is completed up to the third segment of the current image frame at step S406, the segment-unit-coding module divides a next input image frame into three segments, estimates an integer pel motion for the first segment of the current image frame and, at the same time, generates a half/quarter pel image for the first segment, coded at step S404b, at step S408a.

While step S406 is performed, the macroblock-unit-coding module codes each of macroblocks within the third segment, having the estimated integer pel motion, through half/quarter pel motion estimation at step S408b.

The segment-unit-coding module and the macroblock-unit-coding module perform the above process until the input of a corresponding image signal is completed.

Figure 5:
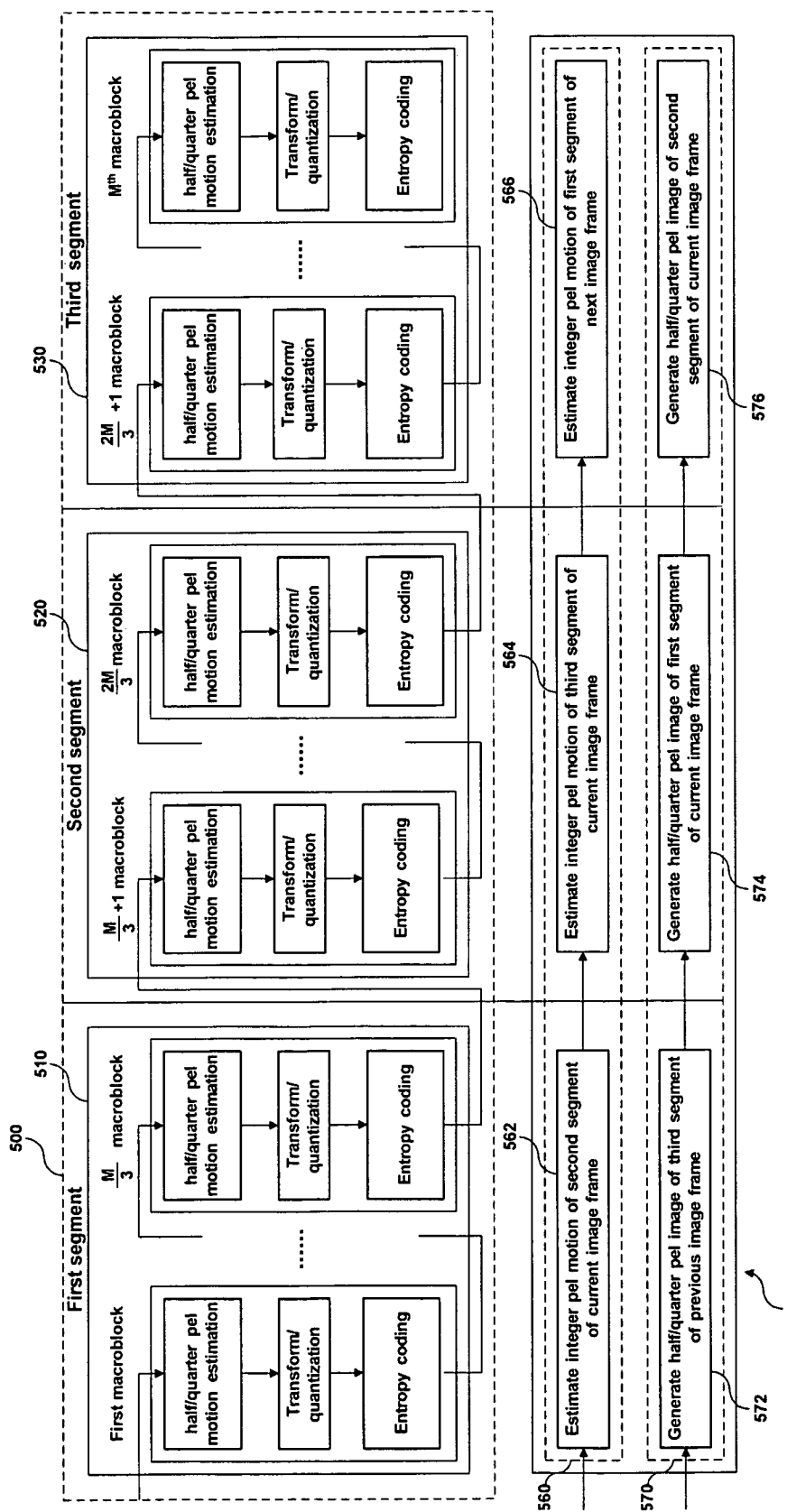
FIG. 5 is a flowchart illustrating a coding method in the case where an image frame is divided into three segments according to the present invention.

FIG. 5 is a flowchart illustrating a coding method in the case where an image frame is divided into three segments according to the present invention.

Referring to FIG. 5, one image frame consists of an M number of macroblocks, and one segment consists of an M/3 number of macroblocks.

The moving image coding apparatus is divided into the macroblock-unit-coding module 500 and the segment-unit-coding module 550, and coding is executed in the two coding modules in parallel.

That is, the macroblock-unit-coding module 500 performs coding, and the segment-unit-coding module 550 estimates an integer pel motion 560 and generates a half/quarter pel image 570 independently, preferably at the same time.

The macroblock-unit-coding module 500 sequentially codes (510) a first macroblock to an $(M/3)^{th}$ macroblock included in the first segment and, after coding each of the macroblocks included in the first segment, codes (520) macroblocks included in the second segment.

A method of the macroblock-unit-coding module 500 coding each of the macroblocks is described below. The integer pel motion estimation unit estimates motion vectors for the respective macroblocks of the first segment, having the estimated integer pel motion, in units of half/quarter pels.

Next, the macroblock-unit-coding module transforms and quantizes each of the macroblocks having its motions estimated in units of half/quarter pels and performs variable length coding on the quantized macroblocks.

However, the integer pel motion estimation results and a half/quarter pel image have to be executed before the macroblock-unit-coding module is executed.

To this end, the integer pel motion estimation unit estimates an integer pel motion for a next segment which is temporally by one segment earlier than a segment coded in the macroblock-unit-coding module.

Furthermore, since interpolation has to be applied to an image with respect to coded segments, the half/quarter pel image generation unit generates a half/quarter pel image for a segment coded immediately before a segment now being coded.

Consequently, while the macroblock-unit-coding module codes (500) the first segment of the current image frame in units of macroblocks, the integer pel motion estimation unit estimates (562) an integer pel motion for the second segment of the current image frame and the half/quarter pel image generation unit generates (572) a half/quarter pel image for the third segment of the previous image frame.

After the above process is completed, the macroblock-unit-coding module codes (520) each of the macroblocks within the second segment of the current image frame, the integer pel motion estimation unit estimates (564) an integer pel motion for the third segment of the current image frame, and the half/quarter pel image generation unit generates (574) a half/quarter pel image for the first segment of the current image frame.

Next, the macroblock-unit-coding module codes (530) each of macroblocks within the third segment of the current image frame, the integer pel motion estimation unit estimates (566) an integer pel motion for the first segment of a next image frame, and the half/quarter pel image generation unit generates (576) a half/quarter pel image for the second segment of the current image frame.

As described above, while the second segment is coded in units of macroblocks, the estimation of an integer pel motion of the current image frame for the third segment and the generation of the half/quarter pel image for the first segment of the current image frame are performed at the same time. The time taken for coding is a maximum value from among "a macroblock-unit coding time", "an integer pel motion estimation time", and "a half/quarter pel image generation time".

As described above, the processes of estimating an integer pel motion, coding each of macroblocks, and generating a half/quarter pel image are sequentially performed on each of the segments. Meanwhile, all the processes are sequentially performed on each of the segments, but are divided and processed. Accordingly, a process for a next segment can be initiated before all the processes are performed on one segment, and thus operations for a plurality of segments are performed in parallel at the same time.

As described above, a person having ordinary skill in the art to which the present invention pertains will understand that the present invention may be implemented in various detailed forms without changing the technical spirit or indispensable characteristics of the present invention. It will be understood that the above-described embodiments are illustrative and not limitative from all aspects. The scope of the present invention is defined by the appended claims rather than the detailed description, and the present invention should be construed to cover all modifications or variations induced from the meaning and scope of the appended claims and their equivalents.

INDUSTRIAL APPLICABILITY

As described above, the moving image coding apparatus and method according to the present invention is suitable for moving image coding techniques, enabling high-speed coding because it uses parallel coding in coding an image frame.

The invention claimed is:

1. A moving image coding apparatus for coding an input image frame, comprising:
   a segment-unit-coding module for receiving the input image frame as a segment-unit image by dividing the input image frame into N number of segments, estimating an integer pel motion, and generating an image therefrom, coded by a macroblock-unit-coding module, as a 1/n pixel image; and
   a macroblock-unit-coding module for receiving the segment-unit image, having the estimated integer pel motion, from the segment-unit-coding module, in units of macroblocks and coding each of the macroblocks through 1/n pixel motion estimation for each macroblock,
   wherein the segment-unit-coding module estimates an integer pixel motion for a next segment in advance before the macroblock-unit-coding module codes the image of the macroblock units having the estimated integer pixel motion, and
   wherein while the operation of the macroblock-unit-coding module for coding the image of the macroblock units having the estimated integer pixel motion proceeds the operation of the segment-unit-coding module for estimating an integer pixel motion for a next segment and for generating a 1/n pixel image for a previous segment image occurs independently and simultaneously and with both operations performed in parallel, and
   wherein the operations of the segment-unit-coding module and the macroblock-unit-coding module are performed on different segments of the image frame in parallel.

2. The moving image coding apparatus according to claim 1, wherein the segment-unit-coding module comprises:
   an integer pel motion estimation unit for estimating a motion vector of an integer pixel unit for a current image frame of segment units;
   a motion estimation information storage unit for storing information estimated by the integer pel motion estimation unit; and
   a 1/n pixel image generation unit for generating an image, coded by the macroblock-unit-coding module, as the 1/n pixel image.

3. The moving image coding apparatus according to claim 2, wherein the 1/n pixel image generation unit generates the 1/n pixel image by enlarging a reference image frame n times in order to estimate a motion for the image, coded by the macroblock-unit-coding module, at an interval of a 1/n pixel.

4. The moving image coding apparatus according to claim 2, wherein the macroblock-unit-coding module comprises:
   a 1/n pixel motion estimation unit for estimating a 1/n pixel motion for the current macroblock image using the integer pel motion estimation information, stored in the motion estimation information storage unit, and the 1/n pixel image generated by the 1/n pixel image generation unit;
   a transform/quantization unit for transforming and quantizing the macroblock image estimated by the 1/n pixel motion estimation unit;
   an entropy coding unit for coding the image transformed and quantized by the transform/quantization unit; and
   an inverse transform/inverse quantization unit for inverse-transforming and inverse-quantizing the image transformed and quantized by the transform/quantization unit.

5. The moving image coding apparatus according to claim 4, wherein the macroblock-unit-coding module further comprises an intra-mode estimation unit for selecting an optimal intra-estimation mode by performing estimation from adjacent and surrounding blocks when coding the macroblock image in an intra mode and for acquiring a compensation image, subjected to intra-mode estimation, from previously coded and adjacent macroblocks using the selected intra-estimation mode.

6. A method of a moving image coding apparatus coding an image frame, the method comprising the steps of:
   (a) dividing the image frame into N number of segments;
   (b) estimating an integer pel motion for segments of the image frame using a segment-unit-coding module;
   (c) coding the segments of the image frame, having the estimated integer pixel motion, in units of macroblocks through 1/n pixel motion estimation for each of the macroblocks within each unit segment using a macroblock-unit-coding module; and
   (d) generating a 1/n pixel image for the segments of the image frame, coded in units of the macroblocks by the segment-unit-coding module,
   wherein in a case where an integer pixel motion for a $n^{th}$ inputted segment is estimated in step (b) and a 1/n pixel image for segments, inputted a predetermined number of times earlier than the $n^{th}$ inputted segment, is generated in step (d), the steps (b) and (d) are performed by the segment-unit-coding module independently and simultaneously,
   wherein the steps (b), (c) and (d) are performed in parallel and simultaneously, and
   wherein the steps (b), (c), and (d) are performed on different segments of the image frame in parallel.

7. The method according to claim 6, wherein the step (c) comprises steps of:
   estimating a motion vector of a 1/n pixel unit using the 1/n pixel image generated through the 1/n pixel motion estimation for each of the macroblocks within one unit segment having the integer pixel motion estimated by the segment-unit-coding module;
   quantizing each of the macroblocks having a motion estimated in unit of the 1/n pixel; and
   performing variable length coding on the quantized macroblocks.

8. The method according to claim 6, wherein generating a 1/n pixel image for a previous segment of the image frame in the step (d) comprises generating an image obtained by enlarging a reference image frame of the segments within the image frame, generated by the macroblock-unit-coding module, n times.

9. A method of a moving image coding apparatus coding an image frame, the method comprising the steps of:
   (a) dividing the image frame into N number of unit segments
   (b) estimating an integer pel motion for a first segment of a first input image frame;
   (c) coding each of macroblocks within the first segment, having the estimated integer pixel motion, through 1/n pixel motion estimation while simultaneously estimating an integer pixel motion for a second unit segment of the image frame;
   (d) coding each of macroblocks within the second segment, having the estimated integer pixel motion, through 1/n pixel motion estimation, estimates an integer pixel motion for a third segment of the image frame, and generates a 1/n pixel image for the coded first segment simultaneously
   wherein the steps (d), estimates an integer pixel motion for a third segment of the image frame, and generates a 1/n pixel image for the coded first segment independently and simultaneously, and
   wherein the steps (b), (c), and (d) are performed on different segments of the image frame in parallel.

10. The method according to claim 9, wherein generating the 1/n pixel image for the coded first segment-in the step (a) (d) comprises generating an image obtained by enlarging a reference image frame of the first segment, coded in units of the macroblocks, n times.

11. A non-transitory recording medium on which a program for coding an image frame is recorded, the program is configured to execute the method of claim 6.

12. A non-transitory recording medium on which a program for coding an image frame is recorded, the program is configured to execute the method of claim 6 comprising the steps:
   (a) estimating an integer pel motion and a 1/n pixel motion for a third segment of a current image frame consisting of N segments inputted in units of segments while simultaneously generating a 1/n pixel image for a coded first segment of the current image frame; and
   coding a second segment of the current image frame, having an integer pixel motion and a 1/n motion estimated, in units of macroblocks.

* * * * *